(12) United States Patent
Wu et al.

(10) Patent No.: US 9,305,268 B2
(45) Date of Patent: Apr. 5, 2016

(54) MONITORING AND REPLAYING USER BEHAVIORS ON THE WEB

(71) Applicants: Tianhao Wu, New Brunswick, NJ (US); Vincent Sgro, New Brunswick, NJ (US)

(72) Inventors: Tianhao Wu, New Brunswick, NJ (US); Vincent Sgro, New Brunswick, NJ (US)

(73) Assignee: Connotate, Inc., New Brunswick, NJ (US)

( * ) Notice: Subject to any disclaimer, the term of this patent is extended or adjusted under 35 U.S.C. 154(b) by 375 days.

(21) Appl. No.: 13/842,153

(22) Filed: Mar. 15, 2013

(65) Prior Publication Data

US 2013/0332398 A1    Dec. 12, 2013

Related U.S. Application Data

(60) Provisional application No. 61/658,664, filed on Jun. 12, 2012.

(51) Int. Cl.
 *G06N 99/00* (2010.01)
 *G06F 11/34* (2006.01)

(52) U.S. Cl.
 CPC .......... *G06N 99/005* (2013.01); *G06F 11/3414* (2013.01); *G06F 11/3438* (2013.01); *G06F 2201/875* (2013.01)

(58) Field of Classification Search
 CPC .............. G06N 99/005; G06F 11/3438; G06F 11/3414; G06F 2201/875
 See application file for complete search history.

(56) References Cited

U.S. PATENT DOCUMENTS

| | | | |
|---|---|---|---|
| 7,941,525 B1 | 5/2011 | Yavilevich | |
| 2004/0054715 A1 | 3/2004 | Cesario | |
| 2007/0271519 A1* | 11/2007 | Hu et al. | 715/745 |
| 2010/0095208 A1 | 4/2010 | White et al. | |
| 2011/0029665 A1 | 2/2011 | Wenig et al. | |
| 2011/0264787 A1 | 10/2011 | Mickens et al. | |

OTHER PUBLICATIONS

Trainable information Agents for the Web, by Bauer et al., published 2000.*
Effective Feature Space Reduction with Imbalanced Data for Semantic Concept Detection, by Lin et al., published 2008.*
Identifying Relations for Open Information Extraction, by Fader et al., published Jul. 2011.*

(Continued)

*Primary Examiner* — Jeffrey A Gaffin
*Assistant Examiner* — Thomas Fink
(74) *Attorney, Agent, or Firm* — John D. Lanza; Foley & Lardner LLP

(57) ABSTRACT

The present disclosure is directed to methods and systems for monitoring and replaying user interactions with one or more interactive electronic documents. The methods generally include identifying an event comprising an interaction between a user and an interactive electronic document, determining to record the event, identifying for the event a user action, a target element, and a set of element features, and recording data for recreating the event. Generally, the methods and systems monitor a training user's interactions with a document and generate an automated replay agent capable of replaying or recreating those interactions on the document or on similar documents. In some embodiments, the replay agent is able to place a document in a desired state and extract information from the document in the desired state. In some embodiments, the replay agent is trained to recognize elements, or types of elements, in the document.

20 Claims, 8 Drawing Sheets

(56) References Cited

OTHER PUBLICATIONS

Integrating the Document Object Model with Hyperlinks for Enhanced Topic Distillation and Information Extraction, by Chakrabarti, published 2001.*

Improving Pseudo-Relevance Feedback in Web Information Retrieval Using Web Page Segmentation, by Yu et al., published 2003.*

International Search Report & Written Opinion on PCT/US2013/044943 dated Sep. 23, 2013 (CON-004PC).

* cited by examiner

400

```
                James with the Heat
        ┌─────────────────────────────────┐
        │      No. 6 Miami Heat           │
        └─────────────────────────────────┘
                   Small Forward
        ┌─────────────────────────────────┐
        │      Personal Information       │
        └─────────────────────────────────┘
```

Date of Birth   December 30, 1984 (age 26)

Place of Birth  Akron, Ohio, United States

Nationality     American

High School     St. Vincent – St. Mary High School

Listed heght    6 ft 8 in (2.03 m)

Listed Weight   250 lb (113 kg)

Figure 4

User Actions

| Action | Description |
|---|---|
| mousedown | The user presses the mouse button |
| mouseup | The user releases the mouse button |
| mouseout | The user moves the cursor away from an element |
| mouseover | The user passes the cursor over an element |
| click | The user clicks on a mouse button |
| dblclick | The user double clicks on a mouse button |
| keydown | The user presses a keyboard key |
| keypress | The user presses a keyboard key |
| keyup | The user releases a keyboard key |

Figure 5a

Element Attributes

| | | |
|---|---|---|
| • Name | • defaultValue | • onblur |
| • Class Id | • maxlength | • onehange |
| • Href | • defaultChecked | • onclick |
| • Alt | • readOnly | • ondblclick |
| • Src | • accept | • onfaeus |
| • Type | • align | • onkeydown |
| • Style | • vAlign | • onkeypress |
| • Value | • border | • onkeyup |
| • Title | • height | • onload |
| • Text | • width | • onmousedown |
| • Method | • scrolling | • onmousemove |
| • Action | • bgColor | • onmouseout |
| • size | • link | • onmouseover |
| • rows | • defaultSelected | • onmouseup |
| • cols | • index | • onresize |
| • caption | • border | • onseleet |
| • colSpan | • rowIndex | • onunload |
| • rowSpan | | |

Figure 5b

MONITORING AND REPLAYING USER BEHAVIORS ON THE WEB

CROSS-REFERENCE TO RELATED PATENT APPLICATIONS

This application claims priority to U.S. Provisional Application No. 61/658,664, filed Jun. 12, 2012, titled "Monitoring and Replaying User Behaviors on the Web," the entirety of which is incorporated herein by reference.

BACKGROUND OF THE INVENTION

Generally, it is desirable to automate interactions with electronic documents. One exemplary type of interactive electronic document is a website, where each displayed page of the website may be considered a page of the document. As a person (user, reader, visitor, etc.) interacts with the electronic document, display of the document is modified. That is, user actions cause document reactions. Generally, automation of the user actions is desirable for testing an electronic document, placing an electronic document in a derived state, extracting information from an electronic document, and many other reasons.

A simplistic automated agent can be created to replay user actions. However, these simplistic agents fail if the electronic document changes. For example, a simple approach is to record a series of user actions (e.g., a pointer event such as a mouse click) and a location for each action occurrence (e.g., screen coordinates for the pointer). However, simplistic replay of these recorded user actions fails if the action targets move away from the recorded coordinates. These simple approaches may suffice where the electronic document does not change or is under the control of the party creating the automated agent. A more robust approach is needed for interactive electronic documents that change routinely and/or change outside the control of the party operating the automated agent.

SUMMARY OF THE INVENTION

The present disclosure is directed to methods and systems for monitoring and replaying user interactions with one or more interactive electronic documents. Generally, the methods and systems monitor a training user's interactions with a document, for example, a website, and generate an automated replay agent capable of replaying or recreating those interactions on the document or on similar documents. In some embodiments, the replay agent is able to place a document in a desired state and extract information from the document in the desired state. In some embodiments, the replay agent is trained to recognize elements, or types of elements, in the document.

In one aspect, an embodiment of the invention relates to a method of automating user interactions with one or more interactive electronic documents. The method includes monitoring, by a training module executing on one or more computer processors, interactions between a user and an interactive electronic document having a plurality of elements. The method includes identifying, by the training module, an event, which may be referred to as "a first event", the event comprising at least one interaction between the user and the interactive electronic document. The method includes evaluating, by the training module, criteria for determining whether or not to record the event. The method can determine to record the event or not to record the event. The method includes identifying, by the training module, for the event, a user action, a target element for the user action, the target element in the plurality of elements, and a set of element features of the target element and of at least one additional element in the plurality of elements. When the method determines to record the event, the method includes recording, by the training module, responsive to the determination to record the first event, data for recreating the event on a second interactive electronic document. The data allows for recreating the event by identifying a replay target in the second interactive electronic document based on the plurality of element features and by applying the user action to the identified replay target. In some embodiments of the method, the method further includes assigning a relevancy score to each element feature in the plurality of element features. In some embodiments of the method, evaluating criteria for determining whether or not to record the first event includes comparing a pre-event display state to a post-event display state.

In some embodiments of the method, the method further includes training, by the training module, a machine learning module using the event and the identified plurality of element features, and recording data for recreating the first event further comprises recording the trained machine learning module. The method may further include training, by the training module, the machine learning module using a plurality of negative events, each negative event representative of the user action applied to an element in the plurality of elements other than the target element, and training, by the training module, the machine learning module using a plurality of artificial positive events, each artificial positive event representative of the user action applied to the target element and a sub-set of the identified set of element features. In some embodiments, the machine learning module is a support vector machine. In some embodiments, recording data for recreating the first event includes generating, by the training module, conditional-logic instructions for identifying the replay target in the second interactive electronic document and for applying the user action to the identified replay target and recording, by the training module, the generated conditional-logic instructions.

In one aspect, an embodiment of the invention relates to a system for automating user interactions with one or more interactive electronic documents. The system includes one or more processors configured monitoring interactions between a user and an interactive electronic document having a plurality of elements. The processors are configured to identify an event, which may be referred to as "a first event", the event comprising at least one interaction between the user and the interactive electronic document. The processors are configured to evaluate criteria for determining whether or not to record the event. The processors are configured to determine to record the event or not to record the event. The processors are configured to identify, for the event, a user action, a target element for the user action, the target element in the plurality of elements, and a set of element features of the target element and of at least one additional element in the plurality of elements. The processors are configured to record, responsive to a determination to record the event, data for recreating the event on a second interactive electronic document. The data allows for recreating the event by identifying a replay target in the second interactive electronic document based on the plurality of element features and by applying the user action to the identified replay target. In some embodiments of the system, the processors are further configured to assign a relevancy score to each element feature in the plurality of element features. In some embodiments of the system, evaluating criteria for determining whether or not to record the first event includes comparing a pre-event display state to a post-event display state.

In some embodiments of the system, the processors are configured to train a machine learning module using the event and the identified plurality of element features, and record the trained machine learning module. In some embodiments of the system, the processors are configured to train the machine learning module using a plurality of negative events, each negative event representative of the user action applied to an element in the plurality of elements other than the target element. In some embodiments of the system, the processors are configured to train the machine learning module using a plurality of artificial positive events, each artificial positive event representative of the user action applied to the target element and a sub-set of the identified set of element features. In some embodiments, the machine learning module is a support vector machine. In some embodiments, the processors are configured to generate conditional-logic instructions for identifying the replay target in the second interactive electronic document and for applying the user action to the identified replay target and record the generated conditional-logic instructions.

In some embodiments of the methods and systems, the first interactive electronic document is a web site comprising one or more interlinked web pages and the second interactive electronic document is a web site comprising one or more interlinked web pages. In some embodiments, the second interactive electronic document is a modified version of the first interactive electronic document. In some embodiments, the second interactive electronic document is hosted by a third-party. In some embodiments, the user is not an author of the document and/or unable to control the source version of the document. In some embodiments, the user action is one of mousedown, mouseup, mouseout, mouseover, mouse click, mouse dblclick, keydown, keyup, and keypress. In some embodiments, an element feature is a document object model attribute. In some embodiments, the at least one additional element is one of: a document object model child element of the target element, a document object model parent element of the target element, a document object model sibling element of the target element, a document object model descendant element of the target element, a document object model element preceded by the target element, and a document object model element immediately preceded by the target element. In some embodiments, the criteria for determining whether or not to record the first event includes a minimum length of time for the first event.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 4 is an example document with content for a biography;

FIG. 5*a* is a table actions that may be recorded;

FIG. 5*b* is a table of element attributes;

DETAILED DESCRIPTION OF THE PREFERRED EMBODIMENTS

Figure 1:
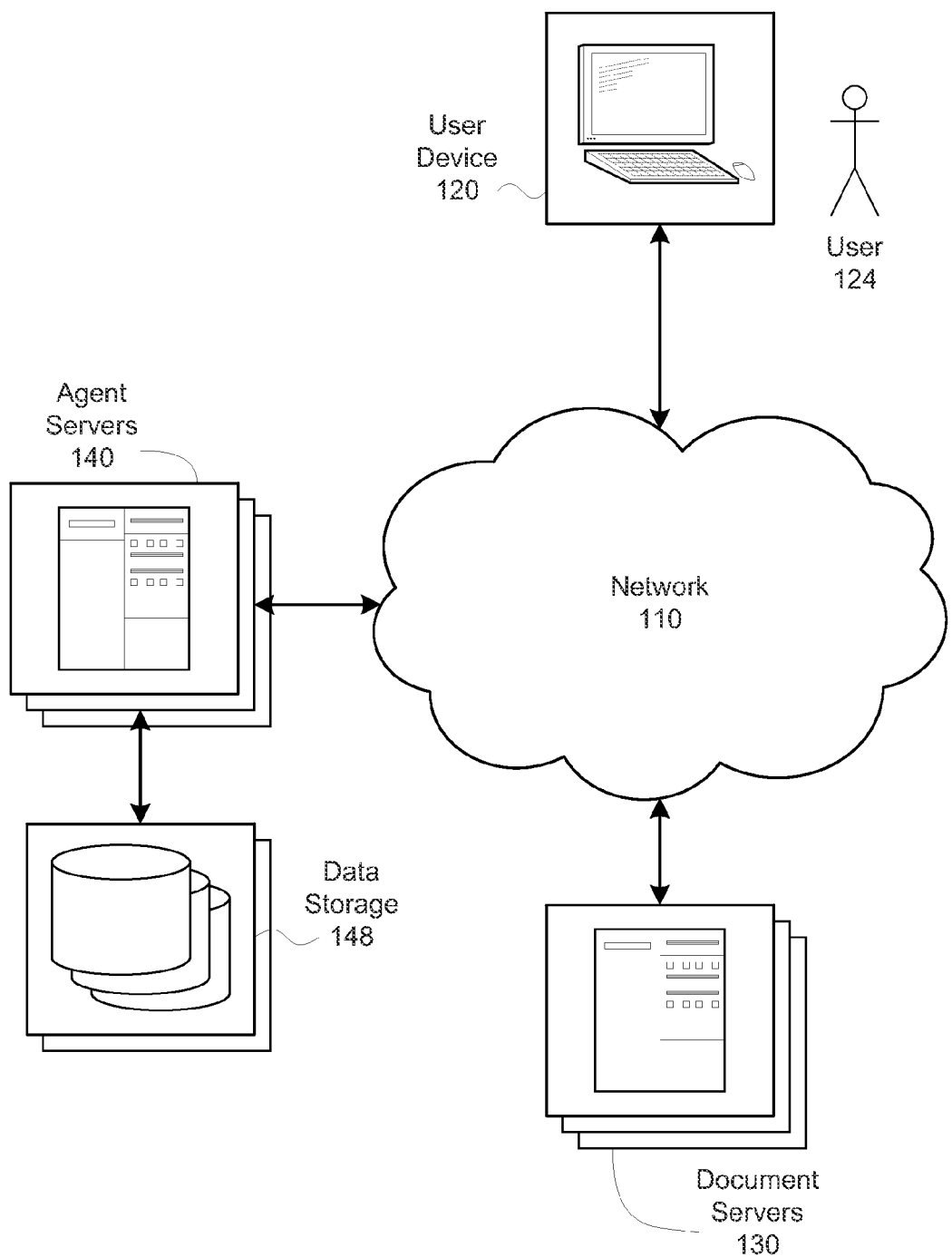
FIG. 1 illustrates a network environment.

Following below are more detailed descriptions of various concepts related to, and embodiments of, methods, apparatuses, and systems introduced above. The various concepts introduced above and discussed in greater detail below may be implemented in any of numerous ways, as the concepts described are not limited to any particular manner of implementation. Examples of specific implementations and applications are provided primarily for illustrative purposes.

Generally, an interactive electronic document may be modeled as a set or collection of elements. For example, the World Wide Web Consortium ("W3C") has promulgated the "Document Object Model," ("DOM") as a conceptual interface to interactive electronic documents. The document object model is helpful in that the set or collection of elements of a document may be treated as DOM elements forming a data structure, such as a tree hierarchy, although the structure may not actually exist in the document itself. Many interactive electronic documents, such as documents created in HTML, XHTML, or XML, can be treated in this manner.

Additional presentation information, as may be present in cascading style sheets (CSS), can also be reflected by the DOM and/or by a display device's rendering model. For example, a web browser typically internally models a web page with a render tree. The render tree may be derived from the DOM and CSS information. In some instances, the render tree includes elements resulting from CSS information that are not present in the DOM. Generally, the render tree contains specific information regarding the dimensions, positions, and other visual characteristics that each document element will have when rendered to a bitmap or screen. Some web browsers use a render tree to determine which aspects of the resulting bitmap or display require updating when dynamic content or styling information is modified.

Generally, an automated replay agent may be constructed that can identify an element for a document that is similar to an element in another document. In some embodiments, the element is a DOM element. In some embodiments, the element is a render tree element. In some embodiments, the element is an element for a generalized model of an interactive electronic document. The constructed automated replay agent identifies elements and determines if they match an element from a training phase. For example, a machine learning module may be trained by a user to recognize elements of an interactive electronic document. Once trained, the machine learning module may then be used to identify similar elements in other documents. In some embodiments, the other documents may be significantly different from the training document.

Tools for recognizing aspects of a document that match aspects of another document may be used to construct robust automated replay agents for interactive electronic documents. These tools may be used to compare documents, to identify how a document has changed, and to extract information from multiple pages of a document, or from multiple documents, where the information shares features or document characteristics. For example, an agent may be generated to process a set of biographies. The agent may be trained on a first biographical document (or set of documents) to identify information such as the subject's name, background, role, and accomplishments. The agent may then be used to identify names, backgrounds, roles, and accomplishments for other people with similarly structured biographical documents. As another example, an agent may be generated to recognize dynamic features of a web page and to identify when these features have changed or been updated. For example, the agent may be used to monitor a website where people routinely post information. Each post may have a timestamp, a subject line, and content body. The agent may routinely visit the website and detect a new timestamp. The agent may then follow a link associated with the subject line and retrieve the content body for the new post. Other applications and uses of the technology described are also within the scope of this disclosure.

FIG. 1 illustrates a network environment. A user 124 interacts with an electronic document via a user device 120. The interactive electronic document is hosted by one or more document servers 130 and provided to the user device 120 via a network 110. One or more agent servers 140 monitor the user's interactions and generate replay agents, which are stored at data storage 148. In some embodiments, the interactive electronic documents are hosted locally at the user device 120. In some embodiments, the interactive electronic documents are hosted by the agent servers 140. In some embodiments, an agent generator runs locally at the user device 120.

The user 124 may be any person interacting with a user device 120. The user 124 may be a person wishing to construct or generate an automated replay agent. The user 124 may allow his or her interactions to be monitored, e.g., for testing purposes. The user 124 may have limited experience creating automated replay agents.

Figure 2:
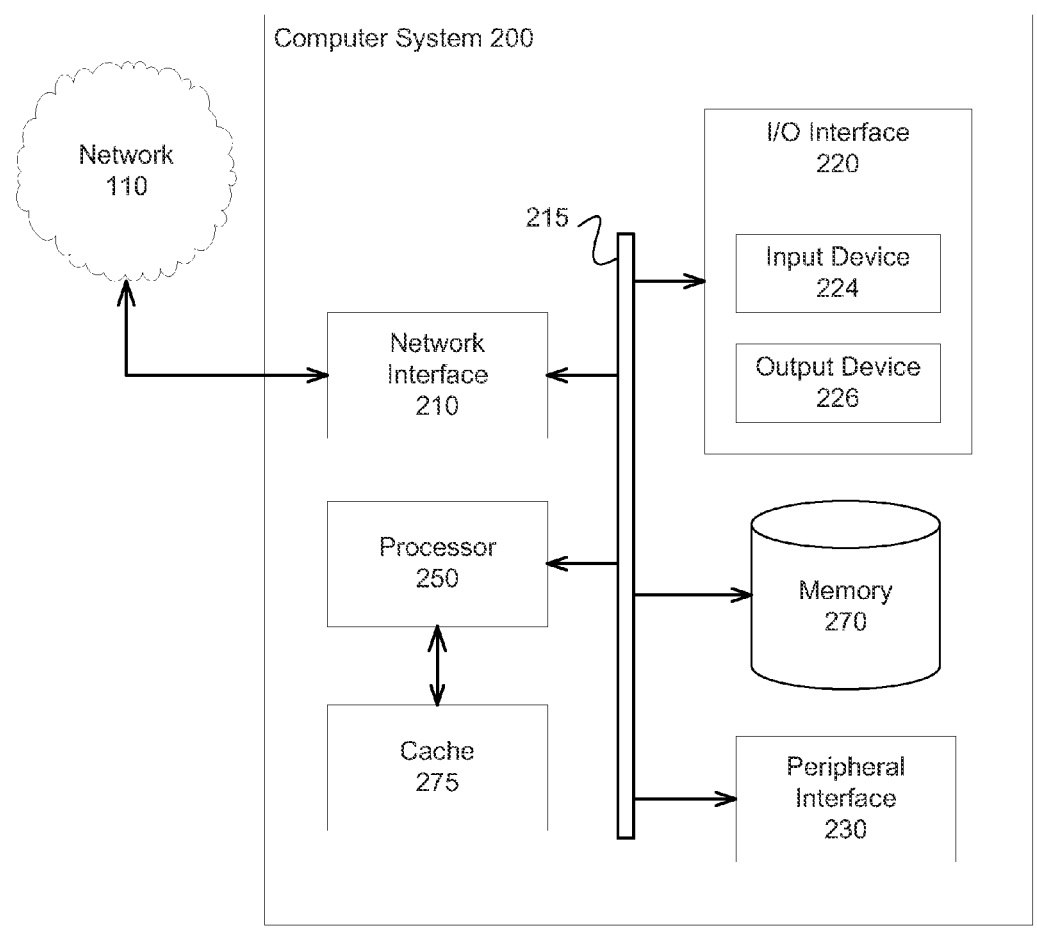
FIG. 2 illustrates an example computing system.

The user device 120 may be any computing device capable of presenting an interactive electronic document to a user 124 and receiving user actions from the user 124. The user device 120 illustrated in FIG. 1 is capable of communication via the network 110. The user device 120 may receive an interactive electronic document from a document server 130, e.g., via the network 110. The user device 120 may host an interactive electronic document locally. The user device 120 may be a smart phone, a tablet, a laptop, a gaming device, a television set-top box, a personal computer, a desktop computer, a server, or any other computing device. The user device 120 may include an input interface, e.g., a keyboard, a mouse, or a touch screen. The user device 120 may include an output interface, e.g., a screen, a speaker, or a printer. In some embodiments, the user 124 is presented with an interface in the form of a web page. In some embodiments, the user device 120 is a computing system 200, as illustrated in FIG. 2 and described below.

The document servers 130 may be any system able to host interactive electronic documents. For example, the document servers 130 illustrated in FIG. 1 provide interactive electronic documents to the user device 120 via a network 110. The document servers 130 may be controlled by a party that is not associated with a person or party creating the automated replay agent. The document servers 130 may be controlled by a government, a corporation, an academic institution, or any other entity. In some embodiments, a document server 130 is a virtual server or service operated in a cloud computing environment. In some embodiments, a document server 130 is a computing system 200, as illustrated in FIG. 2 and described below.

The agent servers 140 may be any system for creating an automated replay agent. The agent servers 140 illustrated in FIG. 1 remotely monitor user interactions at the user device 120. In some embodiments, a client application is run on the user device 120. The client application may create the automated replay agent. The client application may forward data to the agent servers 140. The agent servers 140 may store data, e.g., a constructed replay agent. In some embodiments, the agent servers 140 may store data in a data storage system 148, as illustrated in FIG. 1. In some embodiments, the agent servers 140 communicate with the data storage system 148 via the network 110. In some embodiments, an agent server 140 is a virtual server or service operated in a cloud computing environment. In some embodiments, an agent server 140 is a computing system 200, as illustrated in FIG. 2 and described below.

The data storage 148 may be any system for recording data and may include any form of computer readable media. The data storage 148 may host a database. The data storage 148 may use a structured file system. The data storage 148 may be a network attached storage system. The data storage 148 may be a storage area network. The data storage 148 may be co-located with the agent servers 140. The data storage 148 may be geographically distributed. In some embodiments, data storage 148 is a virtual storage system or service operated in a cloud computing environment. In some embodiments, a data storage system 148 is a computing system 200, as illustrated in FIG. 2 and described below.

The network 110 can be a local-area network (LAN), such as a company intranet, a metropolitan area network (MAN), or a wide area network (WAN), such as the Internet and the World Wide Web. The network 110 may be any type and/or form of network and may include any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network. In some embodiments, there are multiple networks 110 between participants, for example a smart phone 170c typically communicates with Internet servers via a wireless network connected to a private corporate network connected to the Internet. The network 110 may be public, private, or a combination of public and private networks. The topology of the network 110 may be a bus, star, ring, or any other network topology capable of the operations described herein. The network 110 can be used for communication between the devices illustrated in FIG. 1.

FIG. 2 illustrates an example computing system 200 suitable for use in implementing the computerized components described herein. The example computing system 200 includes one or more processors 250 in communication, via a bus 215, with one or more network interfaces 210 (in communication with the network 110), I/O interfaces 220 (for interacting with a user or administrator), and memory 270. The processor 250 incorporates, or is directly connected to, additional cache memory 275. In some uses, additional components are in communication with the computer system 200 via a peripheral interface 230. In some uses, such as in a server context, there is no I/O interface 220 or the I/O interface 220 is not used. In some uses, the I/O interface 220 supports an input device 224 and/or an output device 226. In some uses, the input device 224 and the output device 226 use the same hardware, for example, as in a touch screen.

In some embodiments, the user device 120 illustrated in FIG. 1 are constructed to be similar to the computing system 200 of FIG. 2. For example, a user 124 interacts with an input device 224, e.g., a keyboard, mouse, or touch screen, to access an interface, e.g., a web page, over the network 110. The interaction is received at the user's device's interface 210, and responses are output via output device 226, e.g., a display, screen, touch screen, or speakers.

In some embodiments, one or more of the document servers 130 and/or agent servers 140 illustrated in FIG. 1 are constructed to be similar to the computing system 200 of FIG. 2. In some embodiments, a server may be made up of multiple computing systems 200. In some embodiments, a server may be a virtual server, for example, a cloud based server. A server as illustrated in FIG. 1 may be made up of multiple computing systems 200 sharing a location or distributed across multiple locations. The multiple computing systems 200 forming a server may communicate using the user-accessible network 110. The multiple computing systems 200 forming a server may communicate using a private network, e.g., a network distinct from the user-accessible network 110 or a virtual private network within the user-accessible network 110.

The processor 250 may be any logic circuitry that processes instructions, e.g., instructions fetched from the memory 270 or cache 275. In many embodiments, the processor 250 is a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein. The processor 250 may be a single core or multi-core processor. The processor 250 may be multiple processors.

The I/O interface 220 may support a wide variety of devices. Examples of an input device 224 include a keyboard, mouse, touch or track pad, trackball, microphone, touch screen, or drawing tablet. Example of an output device 226 include a video display, touch screen, speaker, inkjet printer, laser printer, dye-sublimation printer, or 3D printer. In some embodiments, an input device 224 and/or output device 226 may function as a peripheral device connected via a peripheral interface 230.

A peripheral interface 230 supports connection of additional peripheral devices to the computing system 200. The peripheral devices may be connected physically, as in a FireWire or universal serial bus (USB) device, or wirelessly, as in a Bluetooth device. Examples of peripherals include keyboards, pointing devices, display devices, audio devices, hubs, printers, media reading devices, storage devices, hardware accelerators, sound processors, graphics processors, antennae, signal receivers, measurement devices, and data conversion devices. In some uses, peripherals include a network interface and connect with the computing system 200 via the network 110 and the network interface 210. For example, a printing device may be a network accessible printer.

The computing system 200 can be any workstation, desktop computer, laptop or notebook computer, server, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. For example, the computing system 200 may comprise a gaming device such as a PlayStation (PS 1/2/3/4/x) or Personal PlayStation Portable (PSP) device manufactured by the Sony Corporation of Tokyo, Japan, a Nintendo, Game Boy, or Wii or Wii U device manufactured by Nintendo Co., Ltd., of Kyoto, Japan, or an XBox or XBox 360 device manufactured by the Microsoft Corporation of Redmond, Wash. For example, the computing system 200 may comprise a tablet device such as one of the iPad family of devices manufactured by Apple Computer of Cupertino, Calif.

Figure 3:
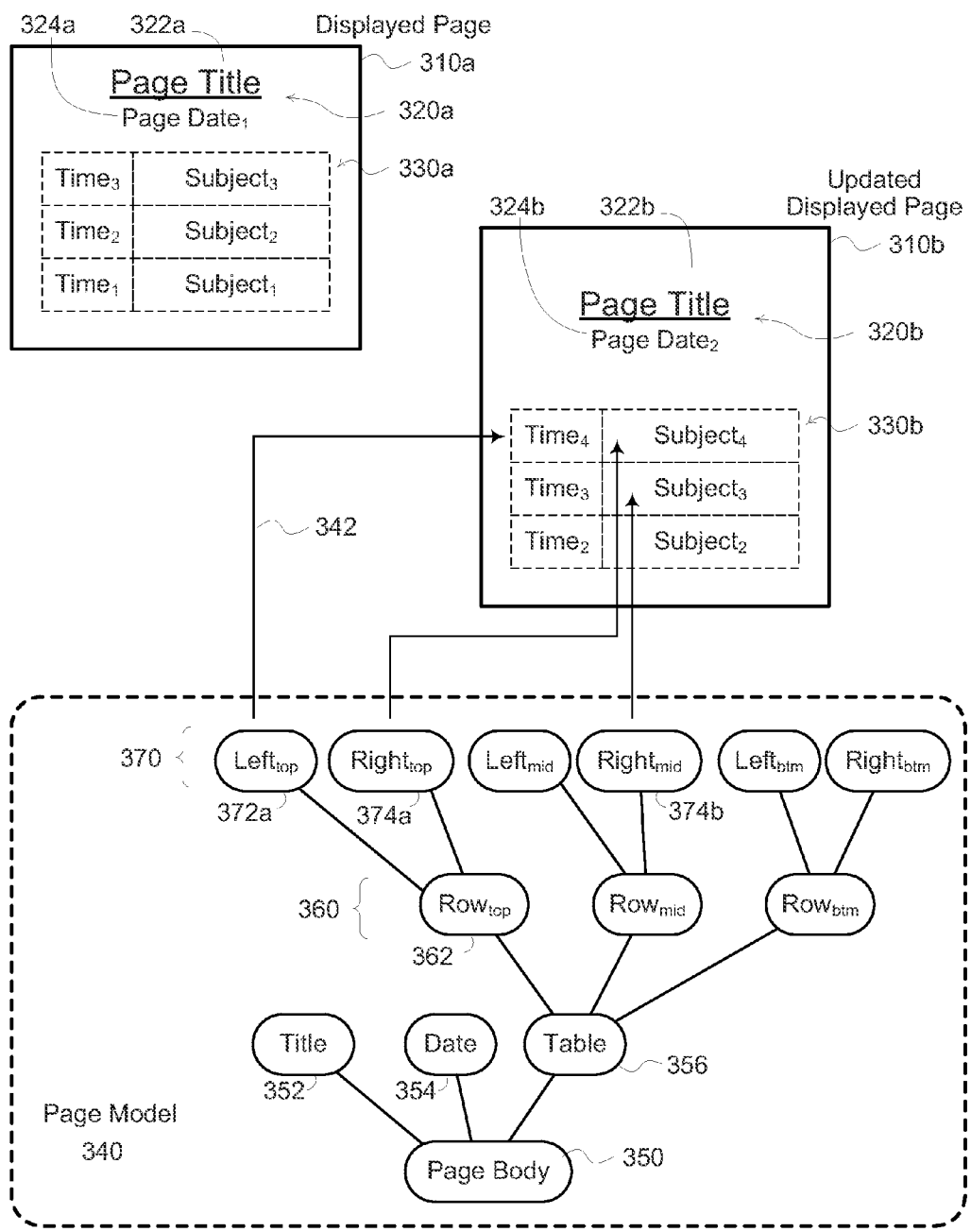
FIG. 3 illustrates a simplified displayed interactive electronic document and a simplified associated document model.

FIG. 3 illustrates a simplified displayed interactive electronic document and a simplified associated document model. Illustrated is a displayed page 310 with introductory content 320 (e.g., a title 322 and date 324) and main content (e.g. a table 330). The displayed page 310 may be simplistically modeled as shown in model 340, although a DOM tree can be more extensive and complex. In the model 340, there is a root node 350 for the page body. The illustrated root node 350 is a parent node for a title node 352, a date node 354, and a table node 356, each of which are a child node to the root node 350. The title node 352, date node 354, and table node 356 are respective sibling nodes because they share the same parent node. The table node 356 is a parent node for table row nodes 360, which in turn are each parent nodes for content nodes 370. A node with no children may be referred to as a leaf node. Generally, leaf nodes are representative 342 of content or metadata for content, e.g., formatting features or other characteristics. An updated displayed page 310b is also illustrated in FIG. 3, where the updated displayed page 310b is a slight variation of the displayed page 310a; however, the structure modeled in the page model 340 is the same for the two displayed pages 310a and 310b.

The updated displayed page 310b is a slight variation of the displayed page 310a. Generally, an interactive electronic document may change over time. Some content may be static, e.g., the title 322 might always be the same, such that the page title 322a for the displayed page 310a is the same as the page title 322b for the updated displayed page 310b. Some content may be stable as compared to other content, e.g., the page date 324 is always a date and only changes once per day, thus the page date 324a for the displayed page 310a may be the same as or different from the page date 324b for the updated displayed page 310b. By comparison, the main content 330 may be updated frequently, as in a stock price listing. The main content 330, for example, may be message board posts, news headlines, stock prices, sports scores, or any other content as may be displayed in an interactive electronic document. The main content 330 illustrated in FIG. 3 is a simple table of timestamps and subjects. A user 124 might click on a subject to retrieve a second page with additional content. The main content 330a for the displayed page 310a may be therefore be different from the main content 330b for the updated displayed page 310b. As illustrated in FIG. 3, a new subject ("Subject-4") is introduced in the top row of the main content 330b in the updated displayed page 310b. The table entries from the original table 330a are moved down. The page model 340 does not change when the displayed page 310a becomes an updated display page 310b; however, the data represented 342 by leaf nodes (e.g., 372a) may have changed.

The page model 340 is a construct representing elements of the displayed page 310 and relationships between elements. As introduced above, the model 340 has a root node 350 representative of the entire page. The root node 350 has child nodes, which may be leaf nodes such as the title node 352, representative of the page title 322, or which may be parent nodes for additional nodes, as with the table node 356, which is a parent node for the row nodes 360. Content represented by a leaf may be static or dynamic as the displayed page is updated. For example, the title 322 might always be the same, such that the page title 322a for the displayed page 310a is the same as the page title 322b for the updated displayed page 310b, and therefore the data identified, or represented, by the title node 352 is unchanged. However, the page date might change daily, thus the page date 324a for the displayed page 310a may be the same as or different from the page date 324b for the updated displayed page 310b, and therefore the data identified, or represented, by the date node 354 may be changed or unchanged.

The page model 340 provides a representation of relationships between content in a displayed page 310. For example, the main content 330 may be in a chronological order such that the content represented by leaf nodes 372a and 374a for the top row represented by a top row node 362 will always be the most recently added content. This "most recent" characteristic of these nodes may be explicit or implicit in the model. The characteristic may be observed by a monitoring system. The characteristic may be entered by a user 124 when creating an agent. The characteristic may be learned by a machine learning module.

The page model 340 generally presents a consistent understanding of the displayed page 310, however, it is derived from the displayed page. That is, the model 340 is a representation of the displayed page and there is no requirement that a page update adhere to the model of a predecessor page. Generally, when an interactive electronic document is modified or altered, a model for the modified version will have many similarities to a model for the precedent version. For example, an update may include additional content after the page date 324, but before the table 330. The resulting page model might then have an additional child node stemming from the page body node. Although the model has changed, the relationship between rows in the table has not. Some changes to a page model can be tolerated without disrupting an agent that relies on analysis of a page model.

FIG. 4 is an example document with content for a biography of LeBron James, as it might appear on a website 400. As an example of web extraction, a user may want to extract all of the Miami Heat players' biographies from an Internet resource, e.g., Wikipedia. In the training phase, the user 124 may direct a monitored system (e.g., a web browser running on a user device 120) to the URL, "http://en.wikipedia.org/wiki/Miami_Heat_all-time_roster." The user can follow a link for one player (e.g., selecting the URL "http://en.wikipedia.org/wiki/LeBron_James" for LeBron James as illustrated in FIG. 4) from a list of players, and instruct the monitoring system to acquire the biography. The system creates an automated replay agent that can recognize the features of a biography. Later, during an extraction phase, the automated replay agent iterates through all of the players on the roster and extracts biographies for each of the players.

FIG. 5a is a table actions that may be recorded. Each action occurs in the context of an event. That is, the user 124 does an action listed in FIG. 5a and this action targets one or more elements in a displayed page change. Usually, the user action results in state change, where there is a pre-event state of the document and post-event state of the document. An event may be a user entering data into a form, text field, or other input box. Where an event includes a data submission by a user, the data entered is a parameter. In some embodiments, a replay agent may be configured with alternative parameters. For example, a parameter may be a user name and password, which could be different for different replays. An event may be a user hovering the mouse icon over an image for a length of time. An event may be a user clicking on an HTML link. An event may be a user action that triggers a javascript execution. An event may be a user action that triggers an AJAX execution.

FIG. 5b is a table of element attributes. The target of a user action is an element of the document. An element may have a tag name, e.g., the "a" in an anchor tag such as <a href=" . . . "> . . . </a>. An element may have a render shape (e.g., in the render tree). An element may have an attribute, as listed in the table shown in FIG. 5b. An element may have an attribute, such as a font, style, position, transparency, or clipping region. An element may have an attribute indicated in metadata, the DOM, a CSS, a render tree, or anywhere else that element attribute data may be represented. An element may have context within a cascading style sheet (CSS). An element may have context within the document model, e.g., the DOM or a render tree (e.g., a web browser render tree). An element may have a text characteristic or value.

Figure 6:
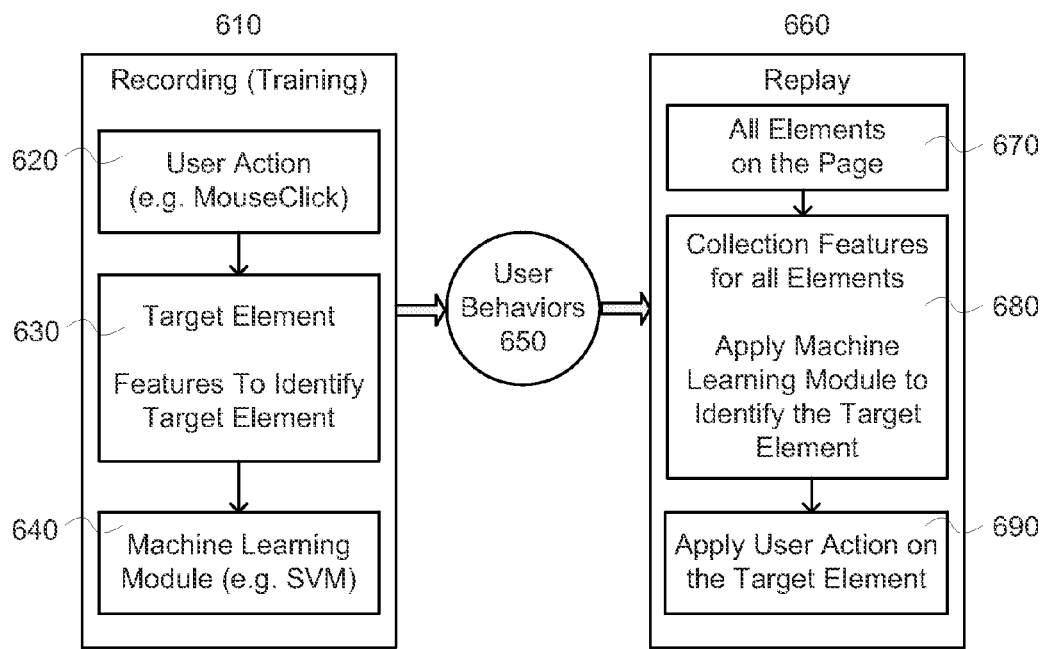
FIG. 6 illustrates a high level view of a recording phase and a replay phase.

FIG. 6 illustrates a high level view of a recording phase and a replay phase. A recording phase 610 is used to generate an automated replay agent. In the recording phase 610, or training phase, user interaction with an interactive electronic document is monitored, e.g., by a training module running either locally on the user device 120 or remotely on an agent server 140. Each user action 620 indicates a possible recordable event. For example, a mouse click on a web page link may be recorded. Each user action 620 has a respective target element 630 within the document. For example, a web page link may be a target for a mouse click. The training module may analyze features of the target element 630. In some embodiments, the training module may analyze features of additional elements present in the page. For example, referring back to the page model 340, the training module may compare features of sibling nodes, where each node indicates an element. The user action 620 and target element 630 (and features to identify the target element) are used by a machine learning module 640 to train a replay agent to recreate the event with other documents. In some embodiments, the machine learning module is a support vector machine. The recording phase 610 processes user behaviors 650 to create an automated replay agent.

The automated replay agent may be applied to interactive electronic documents in a replay or testing phase 660. The agent may be run on an agent server 140 or a local user device 120. The agent starts in a known state. For example, the agent may begin by loading a document from a uniform resource locator (URL). The agent then recreates a sequence of user actions. For each action that requires a target, the agent examines all of the elements on an the active document page 670. The agent compares the elements to a desired target element and identifies the best match 680. If no match is found (e.g., no element is sufficiently similar), then an error condition may be triggered. For example, the agent may apply the trained machine learning module to a collection of features for all of the elements and the machine learning module identifies elements with sufficiently similar features. The best match is used as a replay target element. The agent applies the user action to the replay target element 690.

During the recording phase 610, a monitoring system (e.g., a training module running on the agent server 140 receiving information from a client-side agent running on the user device 120) may observe a user 124 interacting with the displayed page 310a. For example, a user 124 may click on a link for "Subject$_3$" in the top row of the dynamic content 330a to select the most recent post. The click is a user action 620 and the link is the target element 630. The monitoring system may observe the location of the click event as a display coordinate, as a link with the displayed text of "Subject$_3$" or as a click on the data modeled by a particular content node 374a that is a child node of the top row node 362. The monitoring system may utilize a combination of these locations, e.g., the system may utilize the displayed text for the link and the model node for the link. During replay 660, this information may be used to locate a link for the most recent post. A system that relies solely on coordinates will fail if the exact position of the table has shifted such that the display coordinate no longer points to the top row. For example, the display window may be resized as illustrated. Likewise, a system that relies solely on text matching will fail because it will select for the displayed text "Subject$_3$" instead of the most recent post ("Subject$_4$") in the updated displayed page 310b. A system using a document model can select a link indicated by the Right$_{top}$ leaf node 374a and thus select "Subject$_4$". A system using a hybrid approach may consider additional factors to determine if the correct replay subject is the most recent post as indicated by the Right$_{top}$ leaf node 374a or if the correct replay is the text matching to "Subject$_3$" as indicated by the Right$_{mid}$ leaf node 374b. For example, the system may rely on relevance scores for various characteristics associated with the original selection event. In some embodiments, a machine learning module is trained to recognize the correct replay target using a combination of text analysis and document model analysis. In some embodiments, the W3C DOM is used to model a document or document page. In some embodiments, a machine learning module uses relationships between the target element and other elements in the model.

The user action 620 may be any interaction between the user 124 and the interactive electronic document presented at the user device 120. A user action is, generally, what the user did to an element of the presented document. For example, where the document is a web page, a user clicking on a link is a "click" action and the link is the target element. Other possible actions include keyboard actions, e.g., entering data in a text field, and mouse actions, e.g., placing the mouse cursor over an element of the page. FIG. 5a is a table actions that may be recorded.

Not all user actions 620 are useful. If a system records all user actions, the system may be overloaded with unnecessary events. For example, a user action that does not have any contribution to the process for restoring a page state in replay mode can be ignored. However, important user actions should be recorded. It is not always clear when a user action is important. For instance, a mouseOver user action may trigger an AJAX load. If the mouseOver action is not recreated during the record phase 610, then the system will lose the AJAX load during the replay phase 660. Generally, if a mouseOver action triggers a change in the document (e.g., the DOM tree changes), then it may be important and should be recorded. The "mouseMove" action and "mouseWheel" action typically only change the view and do not change the document (or the DOM tree). Therefore, the mouseMove and mouseWheel actions can usually be ignored.

During the recording phase 610, most recorded user actions have a target element 630. For each target element, the training module may record some features about the target element and some context features, e.g., features of the target element's parent, sibling, and child nodes in a document model (e.g., the model 340 illustrated in FIG. 3). In some embodiments, the training module may compute a similarity score for the each feature, comparing the similarity of the feature in the target element with the same feature in contextual elements. In some embodiments, the similarity score is normalized as a value between 0 and 1 and divided by a standard deviation for the feature in the overall training set. Features that may be used include, but are not limited to, tag names, element attributes (FIG. 5b is a table of element attributes), and element drawing rectangles (the rendering shape of the element on the screen, as may be indicated in a rendering tree). Context for the target element is also used, including, but not limited to, where the target element falls in the document model (e.g., $n^{th}$-child, $n^{th}$-last-child, child of, descendant of, immediately preceded by, preceded by, etc.).

Text in element features may be compared in generating similarity scores. For the features needing text comparisons, an edit distance algorithm can be used to compute the similarity of two text strings. Generally, an edit distance algorithm calculates how many text characters need to be removed from, added to, or changed in, one text string to make the text string be the same as a second text string. In some embodiments, a word-based variation of an edit distance algorithm is used. A word-based edit distance algorithm compares two text strings to determine how many words need to be removed from, added to, or changed in, one text string to make the text string be the same as a second text string. In some embodiments, word boundaries are defined as matching the \w character in a Perl regular expression. The word based approach can be accurate while using significantly reduced computation time.

To convert character based edit distance to word based edit distance, create a mapping between a word in both strings (s1 and s2) into a single character. Use the single character to represent the word temporarily during the string comparison, and use the basic character based edit distance algorithm to compute the similarity of the modified strings s1 and s2. When there are many unique words in both strings (e.g., more than 256), use UTF-8 characters to represent words in s1 and s2. The Unicode Character Standard version 3.2 has 95,221 characters. In most of cases, this should be enough to cover all the unique words appearing in both s1 and s2. If not, the character set can be extended to 872,532 characters.

Returning to FIG. 6, the machine learning module 630 learns to distinguish between elements matching the target element 620 and other elements present in an interactive electronic document. Generally, a machine learning module processes training data to learn how to distinguish or classify unknown data. In some embodiments, a support vector machine is trained to identify data for inclusion in, or exclusion from, a class. The support vector machine is trained with a group of training cases belonging to the class, referred to as positive training cases, and a group of training cases not belonging to the class, referred to as negative training cases. The trained module may then be provided unclassified data to be classified as either belonging or not belonging. In some embodiments, a linear regression module is used to identify how an element compares to other sample elements. The linear regression predicts if an unknown element is likely to match to an element known to satisfy conditions for selection or is more likely to match an element known not to satisfy conditions for selection. In some embodiments, the machine learning module is a combination of a support-vector module and a linear regression module.

During a training phase 610, each user action 620 with a target element 630 is a single positive training event for a learning machine 640. The single positive training event may be paired with a large number of negative training events. For example, when a user 124 clicks on a link, the user 124 did not click on any other link present on the page. Each element on the page with which the user could have interacted in the same manner, but did not, may be used as a potential event that did not occur. The potential events may be processed by the machine learning module as negative training events.

In some embodiments, only a single training session is used to create an automated replay agent. As a result, each user action is a single positive training event for that action. This creates an imbalance of many negative training events with only one positive training event. To resolve this imbalance, the training module may generate artificial positive training events. An artificial training event may be the same event as the actual training event. An artificial training event may be created with a sub-set of the available information. For example, an artificial training event may be a replica of all of the event information for the actual training event, where the value of one feature is changed slightly. Each positive event may be assigned a confidence score. Each artificial event is assigned a confidence score that is lower than the actual event.

In some embodiments, the number of negative events is limited to a maximum number of events (e.g., 500). In some embodiments, if the number of negative events is below a minimum number of events (e.g., 50) then some negatives training events with the smallest training scores are replicated to make the negative set have at least the minimum number of instances. In some embodiments, the positive events include ten or more replicas of the actual training event combined with a number of artificial training events representative of the user action applied to the target element and a sub-set of the identified set of element features. The number of artificial events generated does not need to match the number of negative events, e.g., 50 positive events is generally sufficient.

In some embodiments, content may be extracted from an interactive electronic document. For example, an automated agent may replay events to locate a particular page, analyze the page, and extract content. Referring back to FIG. 3, the content may be the subject lines in the table 330. The analysis of the updated display page 310b may rely on the page model 340 to indicate each row of the table via the row nodes 360. An automated agent may be trained to perform extraction.

The automated replay agent may be applied to interactive electronic documents in a replay or testing phase 660. During replay, the replay agent recreates a sequence of user actions. For each action that requires a target, the agent examines all of the elements in an active document page 670. For example, the agent may examine each leaf in a DOM tree for the active document page. In some embodiments, the agent limits the elements tested to those elements for which, if the user action was applied, the document would change.

The agent compares the elements to a desired target element and identifies the best match 680. The best match is used as a replay target element. The agent applies the user action to the replay target element 690. When the agent applies the user action, the interactive document may change state. The agent has thus recreated an event from the training. The agent may then recreate a next event, repeating the process with the elements of the interactive document in the new state.

In some embodiments, the user action is to select content displayed in a document and extract the content. The replay agent may recreate a page state as described and extract content from the page when in the desired state.

In some embodiments, the user 124 controls the interactive electronic document. For example, the user 124 may be a document author and uses the replay tool to test the document. The replay agent may be able to access the document significantly faster than a human visitor, allowing for faster test cases. In some embodiments, the user 124 does not control the interactive electronic document. For example, the user 124 may wish to automate access to a third-party document, as in the example of extracting biographies, as illustrated in FIG. 4.

Figure 7:
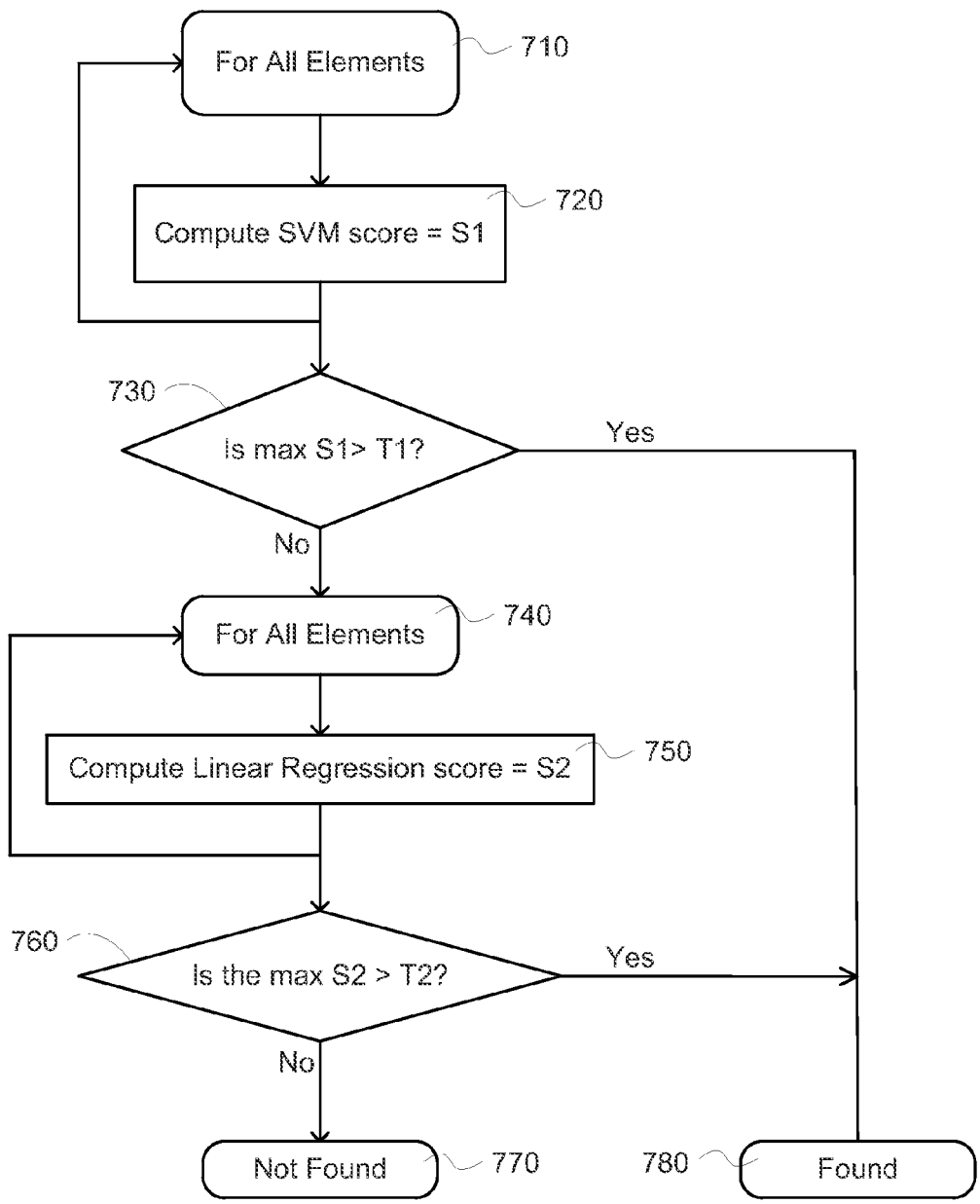
FIG. 7 is a flowchart illustrating the application of a support vector machine and a linear regression module in a replay session.

FIG. 7 is a flowchart illustrating the application of a support vector machine and a linear regression module in a replay session 460, as used in some embodiments. At step 710, a replay agent iterates through each of the elements in an active document. At step 720, the replay agent applies the support vector machine ("SVM") to compute an SVM score (S1) for each element. The SVM score indicates a confidence level as to if an element is the correct replay target for a user action. Steps 710 and 720 are repeated to identify an element with the highest SVM score (max S1). At step 730, the highest SVM score is compared to a threshold score (T1). If max S1 exceeds the threshold T1, the replay agent proceeds to step 780, wherein the element with a SVM score of max S1 is used as the replay target. If max s1 does not exceed the threshold T1, the replay agent proceeds to step 740. At step 740, the replay agent iterates through each of the elements in the active document. At step 750, the replay agent uses the linear regression module to compute a linear regression score (s2) for each element. Steps 740 and 750 are repeated to identify an element with the highest linear regression score (max S2). At step 760, the max S2 is compared to a threshold score (T2). If max S2 exceeds the threshold T2, the replay agent proceeds to step 780, wherein the element with the linear regression score of max S2 is used as the replay target. If max s2 does not exceed the threshold T2, the replay agent proceeds to step 770. At step 770, no acceptable target has been found. The agent then triggers an alert or other action to notify a user that it cannot proceed.

In steps 710 and 720, the replay agent iterates through each of the elements in an active document and applies the support vector machine to compute an SVM score (S1) for each element. The SVM score indicates a confidence level as to if an element is the correct replay target for a user action. Steps 710 and 720 are repeated to identify an element with the highest SVM score (max S1). In some embodiments, the elements are each leaf node in a model tree of the document. In some embodiments, the support vector machine outputs a probability that an element is the target element. The agent repeats steps 710 and 720 to compute a probability for each element in the current page and pick the element with the highest probability.

Generally, a support vector machine models input data as points in a multidimensional space. The machine may be trained by providing examples of things to match (positive training events) and examples of things not to match (negative training events). Each training event is a set of data for the thing to match or not match, and the data is supported by a classification (positive or negative). The machine may then be provided data for an classified thing and asked if the data is for something it should match (positive) or not match (negative). The support vector machine maps the new data into the multidimensional space and provides a score representing how distant the mapped data is from the positive (or negative) training data. In some embodiments, the score is normalized between 0 and 1.

At step 720, the support vector machine inputs data for an element's features and compares this data to the used during training. In some embodiments, features include text features, element attribute features, and css selector features. The features may be represented as a vector. The SVM determines a score representing how likely the vector is to map in multidimensional space to positive training data.

At step 730, the highest SVM score is compared to a threshold score (T1). If max S1 exceeds the threshold T1, the replay agent proceeds to step 780, wherein the element with a SVM score of max S1 is used as the replay target. If max s1 does not exceed the threshold T1, the replay agent proceeds to step 740. In some embodiments, the threshold T1 is 0.9. This threshold is used to decide whether the support vector machine result can be considered with enough certainty. A threshold of 1 would mean that the element is exactly the same as the target element. Some embodiments allow for some degree of change on the page. However, it is not generally helpful to pick an element that has no similarity to the target element. If the support vector machine is unable to identify a replay target element with sufficient precision, then the agent proceeds to a fallback approach. In some embodiments, there is no fallback approach and the agent proceeds directly to step 770.

At steps 740 and 750, the replay agent iterates through each of the elements in the active document and uses the linear regression module to compute a linear regression score (s2) for each element. Steps 740 and 750 are repeated to identify an element with the highest linear regression score (max S2).

At step 760, the maximum linear regression score, max S2, is compared to a threshold score (T2). In some embodiments, an agent operator manually selects the threshold T2. In some embodiments, the module is predesigned and runs with no additional intervention.

In some embodiments, to determine a value for T2, features are grouped according to importance (e.g., very important, important, neutral, and unimportant). In general, each feature's weight range is [1,10]. Very important features are given a weight 10. If this feature in analyzed element is significantly different from the same feature of the target element, it means the element is very likely not the target element. For example, a differing tagName feature is highly indicative of a mismatch. Important features are given weights between 5 and 10. If this feature is significantly different, the element still could be the target element. It should be considered among other features to improve certainty. For example, a similar "href" attribute might not be considered, by itself, as indicative of a match. Some neutral features are given weights between 2 and 4. These features can be helpful in making a correct decision, but cannot clearly identify the target element by itself. For example, the parent element's tagName is a neutral feature. Many unimportant features have a weight of 1. Unimportant features appear in many element and contribute very little in differentiating the target element from other elements. For example, the "nth-child" in CSS selector. In the embodiments using this grouping system, the threshold should be greater than 15 to cover at least one "very important" feature and one "important" feature. In some embodiments, the threshold T2 is the greater of 15 and of one third of the sum of the weight of all "important" features and "very" important features. In some embodiments, an additional tuning parameter is added to this maximum based on demonstrated precision and accuracy for a particular agent.

If max S2 exceeds the threshold T2, the replay agent proceeds to step 780, wherein the element with the linear regression score of max S2 is used as the replay target. If max s2 does not exceed the threshold T2, the replay agent proceeds to step 770.

At step 770, no acceptable target has been found. The agent then triggers an alert or other action to notify a user that it cannot proceed. In some embodiments, the replay agent waits for a period of time before triggering an alarm. The page may not be fully loaded or may be waiting for a background task to complete. If the page changes before the period of time expires, the replay agent returns to step 710. In some embodiments, a change in the DOM indicates that the page has changed and new elements may be available for analysis.

At step 780, an adequate replay target element has been found. The replay agent applies the user action to the replay target element and returns to step 710. In some embodiments, the replay agent makes sure that each user behavior is valid for the active page before the triggering a JavaScript event to simulate the user action. In some embodiments, the replay agent checks if the target element is disabled, the DOM with the target, if all JavaScript event handlers are attached to the target element, etc. When the checks all pass, the replay agent will fire the dependent JavaScript event.

In some embodiments, the replay agent uses JavaScript to simulate user actions. There are two types of user actions considered, "Key" actions and "Mouse" actions. "Key" actions include keypress, keyup, and keydown actions, as illustrated in FIG. 5a. "Mouse" actions include mouseMove, mouseWheel, mouseclick, mousedown, mouseup, mouseover, mouseout, click, and dblclick, as illustrated in FIG. 5a.

In some embodiments, simulation of key action events is modified from the user actions seen during recording or training. The replay agent sets the replay target input field to a parameter value for the text input. The replay agent then triggers a set of JavaScript key events for the replay target input field. In some embodiments, the following set of actions and JavaScript Key events is performed in sequence to simulate a user key action:

1. JavaScript focus
2. JavaScript DOMFocusIn
   [Set the input field value]
3. JavaScript keydown
4. JavaScript keypress
5. JavaScript textInput
6. JavaScript Input
7. JavaScript keyup The keycode sent in JavaScript events 3 through 7 is the last character of the input recorded during the training (recording) mode. Whether it is an AJAX call or a JavaScript function to change the DOM, the last key usually represents what needs to be done.

In some embodiments, simulation of mouse action events is replay of the recorded mouse events with the identified replay target element. In some embodiments, the replay agent automatically adds a JavaScript "change" event right after each mouseup event. This is because the mouseup sometimes can trigger a selection on a web element, and some websites listen for the "change" event to trigger JavaScript functions (e.g., "on Change"). In some embodiments, the training module maintains an event queue. When the training module observes a mouseup user action, it looks back to the queue to see whether the previous mousedown action happens on the same target element. If so, the training module records a JavaScript Click event after the mouseup event.

Figure 8:
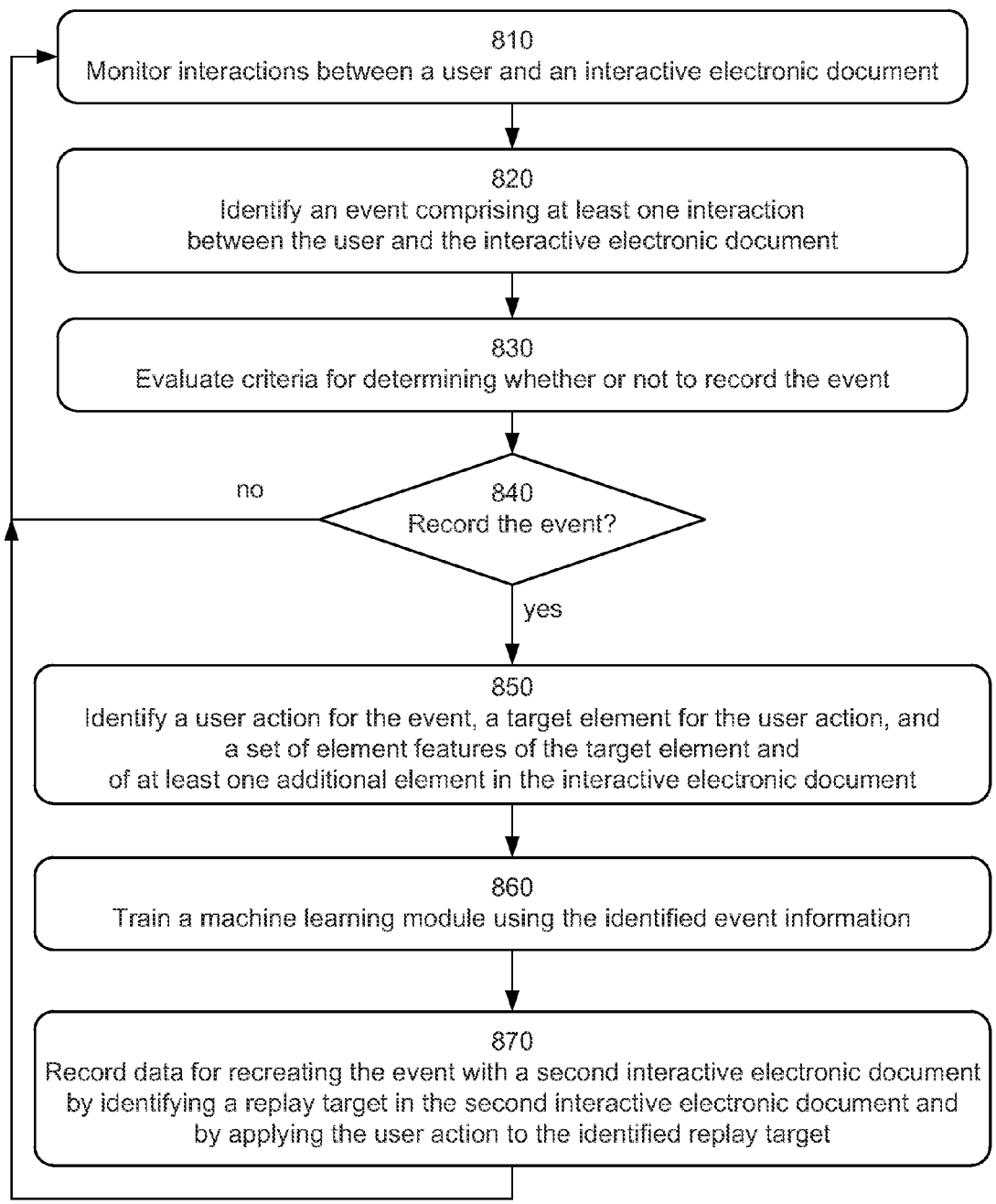
FIG. 8 is a flowchart for creating a replay agent suitable for the uses described.

FIG. 8 is a flowchart for creating a replay agent suitable for the uses described. A training module, executing either on the agent server 140 or on the user device 120, generates a replay agent based upon interactions between a user 124 and an interactive electronic document presented to the user on a user device 120. At step 810, the training module monitors interactions between the user and the interactive electronic document. At step 820, the training module identifies an event comprising at least one interaction. At step 830, the training module evaluates criteria for determining whether or not to record the event. At step 840, the training module determines whether or not to record the event. If the event is not to be recorded, the training module returns to monitoring at step 810. If the event is to be recorded, the training module proceeds to step 850, wherein the training module identifies a user action for the event, a target element for the user action, and a set of element features of the target element and of at least one additional element in the interactive electronic document. At step 860, the training module trains a machine learning module using the identified event information. At step 870, the training module records data for a replaying the event with a second interactive electronic document. Generally, the event may be recreated by identifying a replay target in the second interactive electronic document and applying the user action to the identified replay target.

At step 810, the training module monitors interactions between the user and the interactive electronic document. The training module may monitor the interactions remotely, e.g., from the agent server 140. The training module may monitor the interactions locally on the user device 120. In some embodiments, the training module executes on the agent server 140 and a local client application runs on the user device 120 in communication with the training module running on the agent server 140 via the network 110. In some embodiments, the user 124 provides additional explicit feedback to the training module. For example, the user 124 may select an element in the document and then provide input to the training module about the selected element. The selection event may then be discarded, but the additional input may be used in analysis of the document.

At step 820, the training module identifies an event comprising at least one interaction. An event may be initiated by a user action on a target element. An event may be dependent on other events. For example, a user may enter characters into a text field. Each character entry may be a keypress action, which may be perceived as an event. When the user finishes entering the characters, the user may select a submission button. The result of the submit is dependent on the content of the textbox. During replay, a text input event may be simulated by populating the text field with a parameter value and recreating only a single keypress followed by the submit. In some embodiments, the interactions of entering text and pressing submit is treated as a single event.

At step 830, the training module evaluates criteria for determining whether or not to record the event. Some events do not alter the document or otherwise progress the state. For example, a mouseover event might not trigger a state change. In some embodiments, a user action triggers a brief state change followed by another reversion to the previous state. For example, a user may move the mouse cursor over an element that triggers an animation, but the mouseout action may stop the animation, reverting the page state to a state equivalent to before the mouse movement. Such an event might not be recorded if it does not progress the state of the page. In some embodiments, a mouseover action must last for at least a minimum length of time to be a recordable event. In some embodiments, a mouseover event is ignored unless a mouseover event listener is attached to the target element when the mouseover event is observed and there was at least one DOMChanged event within a sufficient period of time (e.g., within 1 second) on the frame of the element when the mouseover event happened. Criteria for determining whether or not to record the event may include a length of time, whether or not the DOM changes, whether the event was initiated by a key action or a mouse action, or any other criteria upon which a decision might be made.

At step 840, the training module determines whether or not to record the event. If the event is not to be recorded, the training module returns to monitoring at step 810. If the event is to be recorded, the training module proceeds to step 850. The determination is made based on the results of evaluating the criteria in step 840.

At step 850, the training module identifies a user action for the event, a target element for the user action, and a set of element features of the target element and of at least one additional element in the interactive electronic document, e.g., for context. The set of element features may include a tag name, a rendering shape, and/or attributes such as the attributes in the table shown in FIG. 5b. An element may have an attribute, such as a font, style, position, transparency, or clipping region. An element may have an attribute indicated in metadata, the DOM, a CSS, a render tree, or anywhere else that element attribute data may be represented. An element may have context within a cascading style sheet (CSS). An element may have context within the document model, e.g., the DOM or a render tree (e.g., a web browser render tree). An element may have a text characteristic or value. Features of additional elements provide context and distinguish the selected element from the remainder of the document page.

At step 860, the training module trains a machine learning module using the identified event information. In some embodiments, the machine learning module is a support vector machine. Training a machine learning module may include providing the learning module with information about the event and/or the state of the page. The machine learning module may use non-targeted elements of the page a negative training events. The machine learning module may use the identified event as a positive training event. The machine learning module may use artificial events as positive training events, where each artificial event is an application of the user action to a target element having a sub-set of features from the identified features for the identified target element.

At step 870, the training module records data for a replaying the event with a second interactive electronic document. Generally, the event may be recreated by identifying a replay target in the second interactive electronic document and applying the user action to the identified replay target. In some embodiments, the recorded data is information about the event and the event context that can be used to identify a replay target for the user action. In some embodiments, the recorded data includes data for the trained machine learning module. In some embodiments, the second interactive electronic document is a variation or modification of the interactive electronic document used in training.

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, Ruby, C, C++, C#, PROLOG, or in any byte code language such as JAVA. The software programs may be stored on or in one or more articles of manufacture as object code.

Having described certain embodiments of methods and systems, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method of automating user interactions with one or more interactive electronic documents, the method comprising:

monitoring, by a training module executing on one or more computer processors, interactions between a user and an interactive electronic document comprising a plurality of elements;

identifying, by the training module, a first event comprising at least one interaction between the user and the interactive electronic document;

evaluating criteria for determining whether or not to record the first event, wherein the criteria includes a requirement that the first event result in one of: a change in rendering the interactive electronic document, a temporary change in rendering the interactive electronic document lasting more than a threshold length of time, or a change in a document model of the interactive electronic document;

determining, by the training module, to record the first event responsive to an evaluation that the first event satisfies the criteria, wherein at least one other interaction between the user and the interactive electronic document does not satisfy the criteria and is not recorded;

identifying, by the training module, for the first event:
a user action,
a target element for the user action, the target element in the plurality of elements, and
a first set of element features, the first set of element features including element features of the target element and element features of at least one additional element in the plurality of elements, wherein each element feature in the set of element features has a respective relevancy score;

recording, by the training module, responsive to the determination to record the first event, data for recreating the first event on a second interactive electronic document by identifying a replay target in the second interactive electronic document based on similarity scores representative of similarities between the first set of element features and a second of element features associated with the replay target, and by applying the user action to the identified replay target;

training, by the training module, a machine learning module using the first event and the identified set of element features; and recording the trained machine learning module.

2. The method of claim 1,
wherein recording data for recreating the first event comprises recording the trained machine learning module.

3. The method of claim 1, further comprising:
training, by the training module, the machine learning module using a plurality of negative events, each negative event representative of the user action applied to an element in the plurality of elements other than the target element;
training, by the training module, the machine learning module using a plurality of artificial positive events, each artificial positive event representative of the user action applied to the target element and a sub-set of the identified first set of element features.

4. The method of claim 1, wherein the machine learning module is a support vector machine module.

5. The method of claim 1, wherein the first interactive electronic document is a web site comprising one or more interlinked web pages and the second interactive electronic document is a web site comprising one or more interlinked web pages.

6. The method of claim 1, wherein the second interactive electronic document is a modified version of the first interactive electronic document.

7. The method of claim 1, wherein the second interactive electronic document is hosted by a third-party.

8. The method of claim 1, wherein the user action is one of mousedown, mouseup, mouseout, mouseover, mouse click, mouse dblclick, keydown, keyup, and keypress.

9. The method of claim 1, wherein recording data for recreating the first event further comprises:
generating, by the training module, conditional-logic instructions for identifying the replay target in the second interactive electronic document and for applying the user action to the identified replay target; and
recording, by the training module, the generated conditional-logic instructions.

10. The method of claim 1, further comprising assigning the respective relevancy scores to each element feature in the plurality of element features.

11. The method of claim 1, wherein an element feature is a document object model attribute.

12. The method of claim 1, wherein the at least one additional element is one of:
a document object model child element of the target element,
a document object model parent element of the target element,
a document object model sibling element of the target element,
a document object model descendant element of the target element,
a document object model element preceded by the target element, and
a document object model element immediately preceded by the target element.

13. The method of claim 1, wherein evaluating criteria for determining whether or not to record the first event comprises comparing a pre-event display state to a post-event display state.

14. The method of claim 1, wherein the criteria for determining whether or not to record the first event comprises a minimum length of time for the first event.

15. A system for automating user interactions with one or more interactive electronic documents, the system comprising one or more computer processors configured to:
monitor interactions between a user and an interactive electronic document comprising a plurality of elements;
identify a first event comprising at least one interaction between the user and the interactive electronic document;
evaluate criteria for determining whether or not to record the first event, wherein the criteria includes a requirement that the first event result in one of:
a change in rendering the interactive electronic document,
a temporary change in rendering the interactive electronic document lasting more than a threshold length of time, or
a change in a document model of the interactive electronic document;
determine to record the first event responsive to an evaluation that the first event satisfies the criteria, wherein at least one other interaction between the user and the interactive electronic document does not satisfy the criteria and is not recorded;
identify, for the first event:
a user action,
a target element for the user action, the target element in the plurality of elements, and
a first set of element features, the first set of element features including element features of the target element and element features of at least one additional element in the plurality of elements, wherein each element feature in the set of element features has a respective relevancy score;
record on a computer readable medium, responsive to the determination to record the first event, data for recreating the first event on a second interactive electronic document by identifying a replay target in the second interactive electronic document based on similarity scores representative of similarities between the first set of element features and a second set of element features associated with the replay target, and by applying the user action to the identified replay target;

train a machine learning module using the first event and the identified set of element features; and record the trained machine learning module.

16. The system of claim 15, the one or more computer processors further configured to:

train the machine learning module using a plurality of negative events, each negative event representative of the user action applied to an element in the plurality of elements other than the target element; and train the machine learning module using a plurality of artificial positive events, each artificial positive event representative of the user action applied to the target element and a sub-set of the identified first set of element features;

wherein recording data for recreating the first event further comprises recording the trained machine learning module.

17. The system of claim 15, wherein the machine learning module is a support vector machine module.

18. The system of claim 15, wherein the second interactive electronic document is a modified version of the first interactive electronic document.

19. The system of claim 15, wherein an element feature is a document object model attribute and wherein the at least one additional element is one of:

a document object model child element of the target element, a document object model parent element of the target element, a document object model sibling element of the target element, a document object model descendant element of the target element, a document object model element preceded by the target element, and a document object model element immediately preceded by the target element.

20. The system of claim 15, wherein the criteria for determining whether or not to record the first event comprises a minimum length of time for the first event.

* * * * *